No. 673,773. Patented May 7, 1901.
J. R. HARD.
HOOK AND EYE.
(Application filed Oct. 10, 1900.)
(No Model.)
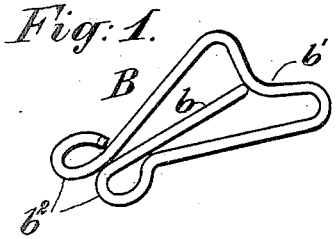
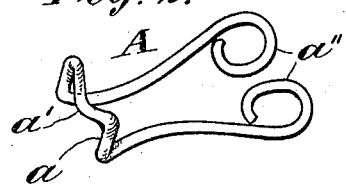
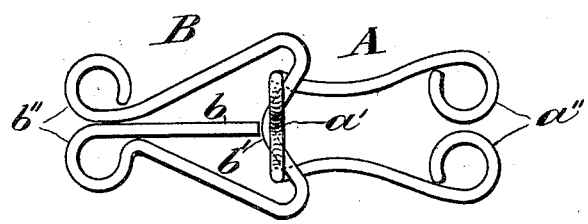
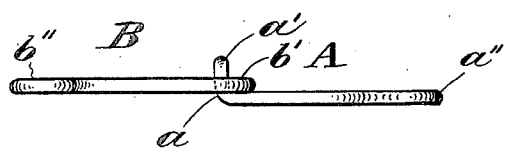
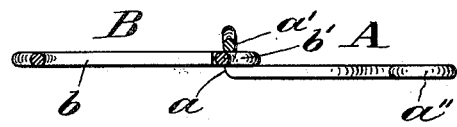
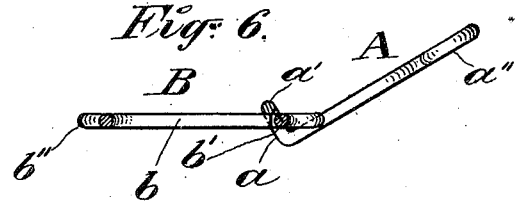
WITNESSES:
INVENTOR
John R. Hard
BY
ATTORNEY

UNITED STATES PATENT OFFICE.

JOHN R. HARD, OF NEW YORK, N. Y.

HOOK AND EYE.

SPECIFICATION forming part of Letters Patent No. 673,773, dated May 7, 1901.

Application filed October 10, 1900. Serial No. 32,603. (No model.)

*To all whom it may concern:*

Be it known that I, JOHN R. HARD, a citizen of the United States, residing in the city, county, and State of New York, have invented certain new and useful Improvements in Hooks and Eyes, of which the following is a specification.

This invention relates to hooks and eyes such as are employed for fastening garments, and particularly to such hooks and eyes as have spring locking means, whereby the hook is prevented from becoming accidentally disengaged from the eye.

The objects of this invention are to provide an eye having a spring locking member or prong with an inwardly-turned or V-shaped bight in its bail, all the parts of the eye being substantially in the same plane, and to provide a hook with an open bill adapted to interlock with both the locking-prong and the said bight, the latter serving to guide and center the bill of the hook and engage its cross-bar. To facilitate engaging the hook with the eye, the cross-bar of the hook has a depression at its middle to engage the spring locking member and when engaged to bear on said bight.

In the drawings, which serve to illustrate an embodiment of the invention, Figure 1 is a perspective view of the eye, and Fig. 2 is a similar view of the hook. Fig. 3 is a plan of the hook and eye engaged, and Fig. 4 is a side view of the same. Fig. 5 is a longitudinal sectional view of the engaged hook and eye, and Fig. 6 illustrates the operation of disengaging the hook from the eye.

A represents the hook as a whole, and B the eye as a whole. Of the hook, $a$ is the broad open bill, having an indentation or downward bend at the middle of the cross-bar $a'$ of said bill. It is provided with the ordinary loops $a''$ for securing it to the goods. Of the eye, $b$ is the spring prong or locking member, and $b'$ is the bail or bight thereof, bent inward, so as to give it a V shape. The prong $b$ extends forward nearly to the apex of the angular or V-shaped bail. The eye has also loops $b''$ for securing it to the fabric. All of the parts of the eye are in or substantially in the same plane, as will be noted in Fig. 4, and the bill of the hook is very short and need not be much hooked or curved, as the prong $b$ prevents accidental disengagement when the strain is relaxed. When the parts are engaged and there is a strain, the cross-bar $a'$ of the hook takes over the apex or salient portion of the bail or bight of the eye, as seen in Figs. 3 and 5, so that no disengagement can occur. It will also be noted from inspection of Figs. 5 and 6 that when the parts are interlocked, as in Fig. 5, no flexure, as in Fig. 6, can be effected, and there must be a slackening of the strain, so that the hook can be moved inward a little in order that the bar of the hook can clear the bail of the eye before the disengagement can be readily effected.

The advantages of the construction described reside in the locking-prong being in the eye and in the same plane with the other parts of the eye, so that when on a garment the free end of the prong cannot readily catch in the fabric; also, in the bail or bight of the eye having a V shape or inturned bend, so that when the hook is engaged the bill thereof will take over the inturned angle of the V, and thus prevent lateral movement of the engaged hook and keep it steady, as well as form a lock, and also in the cross-bar $a'$ of the bill on the hook having at its middle a depression or bend which serves to facilitate the centering of the hook-bill with the locking-prong when the elements are engaged and which rests on the V-shaped bail of the eye when the hook and eye are engaged.

Having thus described my invention, I claim—

1. A hook having an open bill, in combination with a flat eye having at its engaging end an inwardly-bent or V-shaped bail the apex of which is to be engaged by the open bill of the hook, and a spring locking-prong which extends forward substantially to the apex of said bail, all the parts of the eye being in substantially the same plane.

2. A hook having an open bill, the cross-bar of which has a downward bend or depression at its middle, in combination with a flat eye having at its engaging end an inwardly-bent or V-shaped bail the apex of which is to be engaged by the open bill of the hook, and a spring locking-prong which extends forward substantially to the apex of said bail, all the parts of the eye being in substantially the same plane.

3. The combination with a hook A, having an upturned, open, bill $a$, of a flat eye B, having an inwardly-bent or V-shaped bail, $b'$, of such width as to be engaged by the open bill of the hook, and a spring locking-prong $b$ to also engage the bill of the hook, all the parts of said eye being in substantially the same plane, as set forth.

In witness whereof I have hereunto signed my name, this 8th day of October, 1900, in the presence of two subscribing witnesses.

JOHN R. HARD.

Witnesses:
PETER A. ROSS,
HENRY CONNETT.